(12) United States Patent
Masuda et al.

(10) Patent No.: US 6,992,277 B2
(45) Date of Patent: Jan. 31, 2006

(54) METHOD FOR CLASSIFYING AND ARRANGING METALLIC PAINT COLORS

(75) Inventors: Yutaka Masuda, Fujisawa (JP); Yukiyo Tsukahara, Hiratsuka (JP)

(73) Assignee: Kansai Paint Co., Ltd., Hyogo-ken (JP)

(*) Notice: Subject to any disclaimer, the term of this patent is extended or adjusted under 35 U.S.C. 154(b) by 77 days.

(21) Appl. No.: 10/810,839

(22) Filed: Mar. 29, 2004

(65) Prior Publication Data

US 2004/0179023 A1    Sep. 16, 2004

Related U.S. Application Data

(62) Division of application No. 09/236,609, filed on Jan. 26, 1999, now Pat. No. 6,747,662.

(30) Foreign Application Priority Data

Jan. 26, 1998    (JP) .................................. 26381/98

(51) Int. Cl.
*G01J 3/50*    (2006.01)
(52) U.S. Cl. ...................... 250/226; 345/591
(58) Field of Classification Search ................ None
See application file for complete search history.

(56) References Cited

U.S. PATENT DOCUMENTS

| | | | |
|---|---|---|---|
| 3,690,771 A | 9/1972 | Armstrong, Jr. et al. | 356/176 |
| 3,916,168 A | 10/1975 | McCarthy et al. | 235/151.3 |
| 4,479,718 A | 10/1984 | Alman | 356/405 |
| 4,711,580 A | 12/1987 | Venable | 356/406 |
| 4,813,000 A * | 3/1989 | Wyman et al. | 382/165 |
| 4,917,495 A | 4/1990 | Steenhoek | 356/328 |
| 5,231,472 A | 7/1993 | Marcus et al. | 356/402 |
| 5,371,599 A | 12/1994 | Falcoff et al. | 356/405 |
| 5,583,642 A | 12/1996 | Nakazono | 356/405 |
| 5,929,998 A | 7/1999 | Kettler et al. | 356/405 |

FOREIGN PATENT DOCUMENTS

| | | |
|---|---|---|
| EP | 0 375 317 | 6/1990 |
| EP | 0 613 062 | 8/1994 |
| JP | 56-61635 | 5/1981 |
| JP | 61-230778 | 10/1986 |
| JP | 10-10045 | 1/1998 |

* cited by examiner

*Primary Examiner*—Que T. Le
(74) *Attorney, Agent, or Firm*—Wenderoth, Lind & Ponack, L.L.P.

(57) ABSTRACT

Metallic paint colors are classified and arranged by determining the representative color of any metallic paint color; calculating the hu-tone value of said representative color; generating coating color computer graphics indicating optical properties of said metallic paint color in a prescribed range of angles of observation; and preparing a coating color map by arranging said coating color computer graphics over the hue-tone value of said representative color in a hue-tone chart on the monitor screen of a computer system.

4 Claims, 2 Drawing Sheets

METHOD FOR CLASSIFYING AND ARRANGING METALLIC PAINT COLORS

This application is a divisional of Ser. No. 09/236.609 filed Jan. 26, 1999 now U.S. Pat. No. 6,747,662.

BACKGROUND OF THE INVENTION

1. Field of the Invention

The present invention relates to a method for determining the representative color of a metallic paint whose color varies with the angle of observation, a method for classifying and arranging metallic paint colors, and a computer graphic apparatus.

The invention further relates to a computer graphic apparatus for calculating the representative one of metallic paint colors as a hue-tone value, arranging computer graphics of metallic colors expressing their textures on a hue-tone chart, and thereby displaying a chromatological classification of colors and their textures at the same time.

The invention, since it permits identification of the representative color of a paint which contains various effective pigments such as aluminum flakes, mica flakes and plate iron oxide in the coat and whose color varies with the angle of observation, makes possible classification and arrangement of colors and computerized search of colors. Furthermore, the invention provides a computer-based design tool capable of simultaneously evaluating color and texture by superposing computer graphics accompanied with textures.

2. Description of the Prior Art

The colors of the body coating of automobiles in recent years are characterized by the dominance of metallic paints containing various effective pigments (including aluminum flakes, mica flakes and graphite). A metallic paint varies in color with the angle of observation, gives metallic luster, pearly luster or bicolor appearance (an effect to exhibit two or more colors depending on the angle), and this feature is known as texture. As techniques of chromatological classification of the body colors of automobiles, the Munsell scale-and the hue-tone scale have been extensively used for many years.

Solid coating colors can be classified according to a system of color chips prepared with solid pigments. However, it is difficult to extract the representative one out of various colors which a metallic paint would manifest with changes in the angle of observation. Reported methods for classification of others than solid colors including ones for classifying angle-dependent colors for the purpose of grading pearls (Japanese Laid-open [KOKAI] Patent Publication No. 061635/81 and Japanese Laid-open [KOKAI] Patent Publication No. 230778/86), but none of these methods is applicable to so diverse colors as those of automobile body coating.

For this reason, the conventional practice is for the designer to look at metallic paint colors one by one against light, observe color variation from highlight to shade by the eye and, after imaging the representative one of the various colors in his or her head, to finally determine the hue-tone value. This method, however, involves the disadvantages of taking too long a time and variance in results with the designer who appraises the color.

Furthermore, when the designer searches for a color he or she images out of a tremendous variety of paint colors prepared in the past, as the search takes so many man-hours per color checked as the above-described procedure requires, the designer has no other alternative than to make a rough guess to pick out the color he or she remembers, and accordingly is substantially deterred from retrieving the true color.

To sum up the problems noted above, the biggest point is how to determine the representative color of a metallic paint whose color varies with the angle of observation. In a calorimetric approach, if an answer can be given to the question of the calorimetric value taken in what angle can give the representative value of that coating color, the value of that color can be figured out in terms of HVC in the Munsell color scale or the commercial available hue-tone scale, and a color whose value coincides with this calculated value can be chosen as being approximately the imaged color.

SUMMARY OF THE INVENTION

According to the present invention, in order to solve the above-stated problems, there is provided a method by which the representative color of any metallic paint color can be determined by a multiple regression formula of the lightness and saturation of the metallic paint color at not fewer than two angles of observation.

According to the invention, in order to solve the above-stated problems, there is provided a method for classifying and arranging metallic paint colors, comprising:

determination of the representative one of the colors of each metallic paint color;

calculation of the hue-tone value of said representative color;

generation of coating color computer graphics representing the optical properties of said metallic paint color in a prescribed range of angles of observation; and preparation of a coating color map by arranging said coating color computer graphics over the hue-tone value of said representative color in a hue-tone chart on the monitor screen of a computer system.

According to the invention, in order to solve the above-stated problems, there is provided a computer graphic apparatus comprising:

a means to determine said representative color of any metallic paint color out of colorimetric values of said metallic paint color at a plurality of angles of observation;

a means to convert said representative color into a hue-tone value;

a means to generate coating color computer graphics of said metallic paint color from the colorimetric values of said metallic paint color at a plurality of angles of observation; and a means to arrange and display said coating color computer graphics over the hue-tone value in a hue-tone chart generated on a display unit.

The most important technique of the prevent invention is the method to determine by calculation, when any metallic paint color is given, the degree at which the measured value, out of those values measured at many different angles, can give the representative color of that metallic paint color. This core technique is called the "algorithm to determine the representative color of a metallic paint."

As a result of research through repeated experiments by eye observation of metallic paint colors containing various effective pigments as samples, the development of the "algorithm to determine the representative color of a metallic paint" has been successfully accomplished.

Thus, in architecting a computer system to retrieve a designer-imaged color of a metallic paint which contains various effective pigments and whose color varies in many ways with the angle of observation, if the following three items are available, the hue-tone value which is the imaged value can be calculated and, by using this value, conversely any hue-tone value can be retrieved from the reflection factors at many different angles measured in the past:

a) a hard disk for storing the calorimetric values of a metallic paint color at many different angles;

b) an "algorithm to determine the representative color of a metallic paint" for calculating the angle of the representative metallic color from those multi-angle data; and c) an algorithm for calculating the representative color into a hue-tone value.

By adding the following two more items, computer graphics can be pasted on the calculated hue-tone value on the hue-tone chart outputted on a computer graphic monitor screen, and totally novel computer graphics permitting simultaneous appraisal of the hue-tone value, which is a chromatological color class, and of texture can be obtained:

d) computer graphics representing the metallic color variation with each change in angle by the multi-angle reflection factor; and e) computer graphics of the hue-tone chart.

MODE OF IMPLEMENTATION OF THE INVENTION

Determination of the representative color:

The algorithm to determine the representative color of a metallic paint is as follows.

Figure 1:
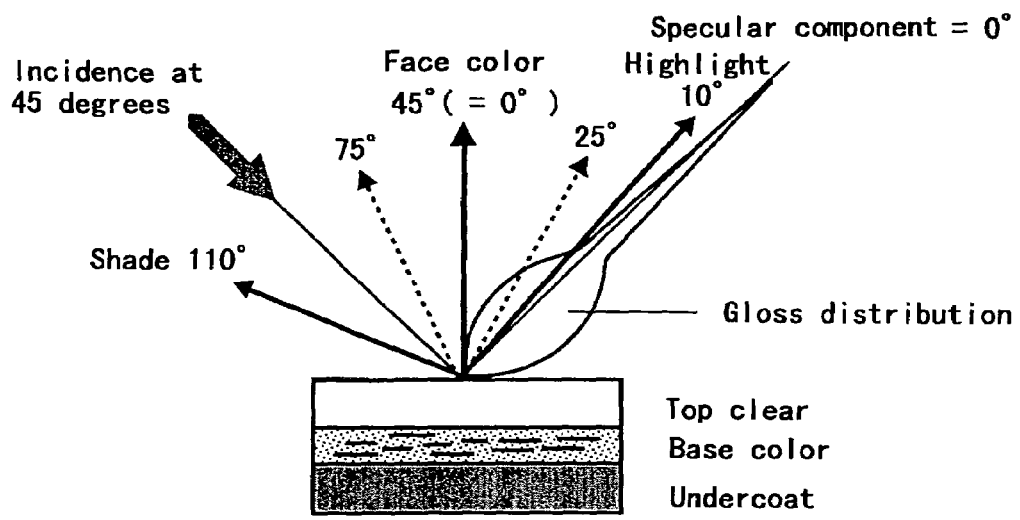
FIG. 1 is a diagram showing the distribution of gloss with the coat structure and angle variation of a metallic paint color.

Generally, the distribution of gloss with the coat structure and angle variation of a metallic paint color is as illustrated in FIG. 1. There are scales of effective pigment (flakes of aluminum, mica or the like) substantially in parallel to one another in a color base containing a colored pigment or dye. The structure of the metallic coat may as well be coating of a so-called color-clear type, i.e. coating of a color-clear paint over a metallic base containing no colored organic pigment.

The highlighted side, given a high reflection factor and made lighter by the reflection of the effective pigment, manifests the glitter of the effective pigment. The shaded side, where the angle comes to a degree for the color of the pigment in the color base to develop itself, is less bright than the highlighted side.

On the other hand, whereas various hue-tone charts are published today, this embodiment uses as its hue-tone chart a laminate-coated version of M*M Chart II (hereinafter abbreviated to M*MC) provided by Nippon Color & Design Research Institute, which is extensively used for color designing of automobiles in Japan. The reason for the choice of the laminate version of M*M Chart II is that the laminate coat is close to the full gloss of the top coat color of automobile bodies.

Figure 3:
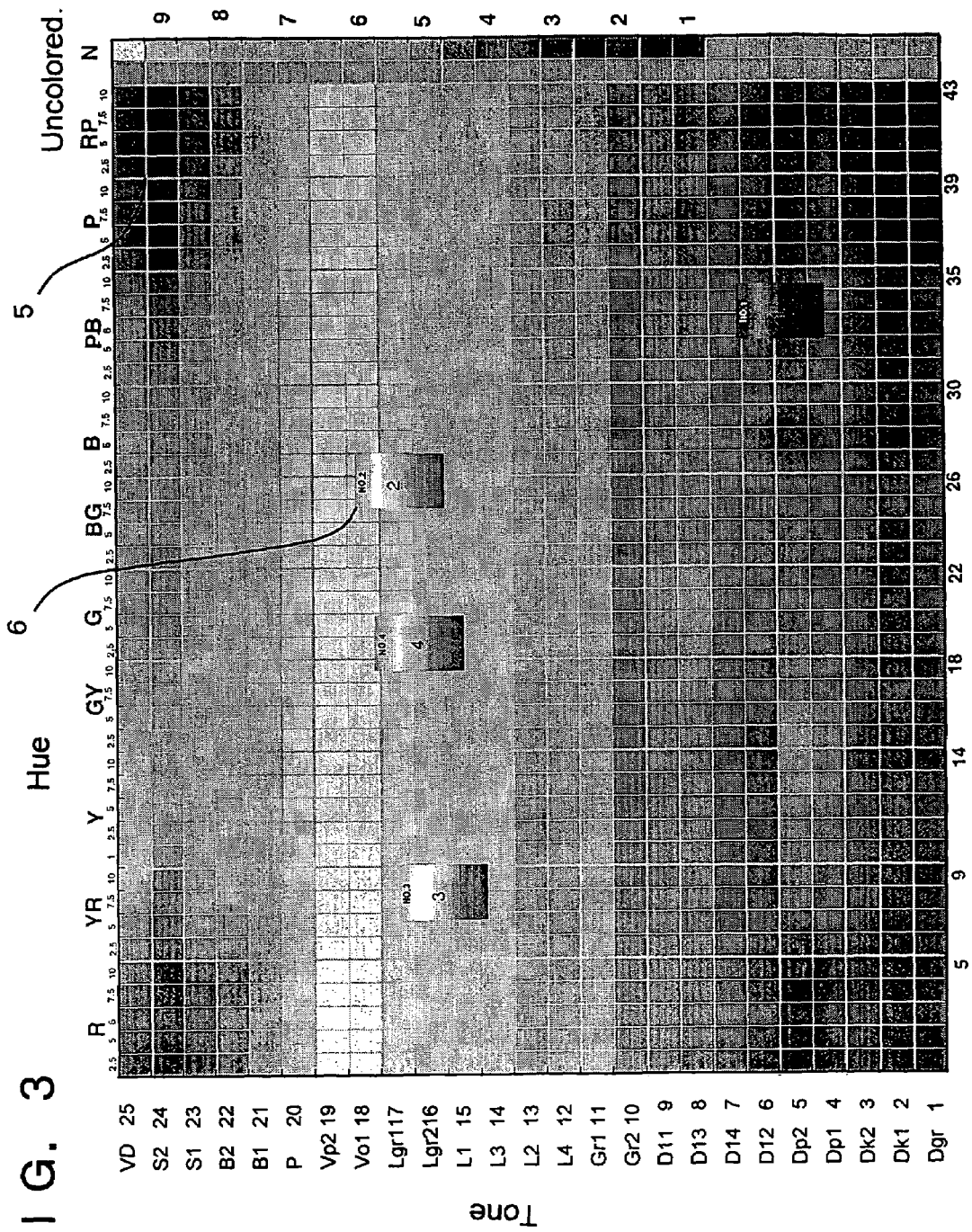
FIG. 3 is a diagram in which 32 metallic paint colors are plotted on a hue-tone chart, with three-dimensional computer graphics arranged over it.

In this M*MC, as shown in FIG. 3, is a two-dimensional table of which the horizontal axis is divided by a total of 44 graduations comprising 43 hues from 2.5R for red to 10RP for violet and uncolored N (in 18 tones) and the vertical axis (Tone) is divided by 25 graduations, wherein altogether 1,093 color chips (43×25+18=1,093) are arranged.

With metallic paint colors used as samples, subjects who were color designers engaged in the color design of the top coating of automobiles, took part in a sensory test by eye observation, and determined the representative color of each sample according to a commercially available M*MC.

Next, in order to calculate the angle of observation this representative color corresponds to, the metallic paint color was actually measured at, for instance, five angles of observation with a multi-angle spectrophotometer; the angle manifesting the smallest color difference (JIS Z 8730) from the representative color was figured out by using an equation, stated in the specification of Japanese Laid-open [KOKAI] Patent Publication No. 10045/98, for predicting the spectral reflectance of any angle; and this angle was supposed to be the angle to give the representative color of this metallic paint color sample. This angle is called the representative angle D.

In practice, since the representative angle D of any given metallic paint color should be predictively calculated from a calorimetric value, an equation for predicting this angle was searched for, and eventually it was discovered that the representative angle D can be accurately calculated with the function type of Equation (1).

$$D = a1 \times V1 + a2 \times V2 + b \qquad \text{Equation (1)}$$

Here, V1 represents a definition calculated from the colorimetric value on the highlighted side. The highlighted side in this context should be, with reference to FIG. 1, within the angle range between 10 and 30 degrees, preferably between 22 and 28 degrees. The definition is a value calculated from a lightness L* and a saturation c*, which are defined in JIS Z 8729, by Equation (2).

$$V = \text{squrt}(L^{*\wedge}2 + c^{*\wedge}2) \qquad \text{Equation (2)}$$

V2 represents a definition calculated from the colorimetric value on the shaded side. The shaded side should be within the range between 35 and 55 degrees, more preferably between 40 and 50 degrees. Coefficients a1, a2 and b are multiple regression coefficients, which can be easily obtained by multiple regression analysis, wherein the object variable is the representative angle D of the metallic paint color identified by eye observation, and the explanatory variables are V1 and V2.

Thus, by determining a1, a2 and b in Equation (1) from samples of a plurality of metallic paint colors, and V1 and V2 in Equation (1) as stated above from the metallic paint color of which the representative angle D is sought, D of this metallic paint color is obtained.

The representative angle D was determined in this manner; the reflection factor of that angle was determined by using the equation, stated in the specification of Japanese Laid-open [KOKAI] Patent Publication No. 10045/98, for predicting the spectral reflectance of any angle; and the Lab* value of the representative color was figured out by a method prescribed by JIS Z 8729.

Determination of the Hue-Tone Value:

Next, in order to convert the Lab* of the representative color into a hue-tone value, the color differences between the Lab* of the color chip of M*MC and the Lab* of the representative color are calculated consecutively to find out the hue-tone value of a color chip which gives the smallest color difference, and this was supposed to be the hue-tone value of the representative one of metallic paint colors.

Generation of the Coating Color Computer Graphics:

Coating color computer graphics of a metallic paint color is the display of optical properties of the metallic paint color on the monitor screen of a computer system, generated by using computerized image processing techniques.

Coating color computer graphics shows, for instance as illustrated in FIG. 1, optical properties in a range of observation angles from 10 degrees (highlight) to 100 degrees (shade) in terms of angle from regular reflection at an incident angle of 45 degrees, and for example as shown in FIG. 3, consists of the rectangularly indicated part 6 in the hue-tone chart 5 on the monitor screen of a computer system. In this rectangularly indicated part 6, colors which are optical properties in a range of observation angles from 10 degrees (highlight) to 100 degrees (shade) are displayed from top to bottom. Preferably, the top part of this rectangularly indicated part should be marked with the code number of its metallic paint color.

This metallic paint color computer graphics can be generated from spectral reflectances obtained by measurement with a gonio-spectrophotometer, for instance, from 10 to 110 degrees in one-degree graduations. Alternatively, this metallic paint color computer graphics can as well be generated by determining the spectral reflectance of the metallic paint color at a desired angle from spectral reflectances measured under the five-angle condition for the metallic paint color in accordance with what is indicated in the specification of Japanese Laid-open [KOKAI] Patent Publication No. 10045/98 and a regression formula and regression coefficient calculated from the spectral reflectances measured under the aforementioned five-angle condition.

Preparation of the Coating Color Map:

On a hue-tone chart prepared on the monitor screen of a computer system, which may be, for example, an M*MC, the hue-tone value of the representative color determined as described above is plotted, and the coating color computer graphics generated as described above is superposed over that plotted point.

The computer graphics obtained by the method so far described is a new type of computer graphics permitting simultaneous appraisal of the hue-tone value, which represents chromatic and design-wise classifications, and the texture of the metallic paint color, and can provide a design tool for coating color development especially useful in the field of color designs handling metallic paint colors.

Computer Graphic Apparatus:

Next will be described, with reference to FIG. 2, a computer graphic apparatus according to a preferred embodiment of the present invention.

Figure 2:
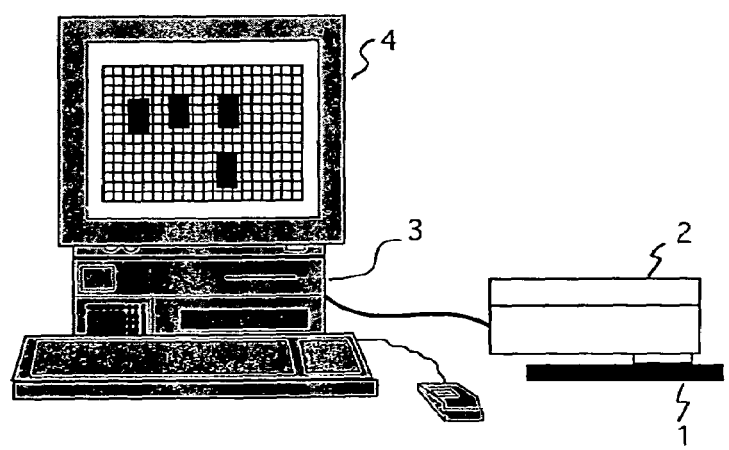
FIG. 2 is a diagram illustrating a computer graphic apparatus according to a preferred-embodiment of the present invention.

This computer graphic apparatus, as illustrated in FIG. 2, measures a metallic coat 1 with a portable spectrophotometer 2; takes into a computer 3 reflection factors at many different angles thereby obtained; figures out, by using Equations (1) and (2), the angle that will give the representative color of any metallic paint; figures out the reflection factor of that angle; converts it into a Lab*; calculates the color difference from the already measured color value Lab* of a color chip in the hue-tone chart; calculates the hue-tone value of the representative color of the metallic paint; and superposes the computer graphics of the metallic paint color over the hue-tone chart on a monitor 4 of the computer. By using this computer graphic apparatus, it is possible to prepare, in a short period of time with an inexpensive and compact apparatus, new graphics permitting simultaneous appraisal of chromatic and design-wise classifications and the texture of the metallic paint color.

DETAILED DESCRIPTION OF THE PREFERRED EMBODIMENT

Determination of the Representative Color:

First will be described the procedure to determine the representative color of a metallic paint.

Thirty-two metallic paint colors in a wide range of colors and a wide range of textures containing metallic effective pigments (including aluminum flakes, mica flakes, plate iron oxide, and micro titanium oxide) were prepared as samples. Then, 17 color designers and technicians involved in the use of colors and coloring materials took part in an eye observation functional test as subjects. They were asked to tell which hue-tone value in the M*MC the representative color of each sample corresponded to and, after totaling the answers, the average representative color chosen by the 17 subjects was determined.

On the other hand, the measurement of colors was accomplished with a portable gonio-spectrophotometer MA68, a product of X-Rite of the United States. The spectral reflectances of each of the 32 metallic paint color samples at five angles against incidence at 45 degrees were obtained, including 15 and 25 degrees of specular component (the highlighted side), 45 degrees in front, 75 and 110 degrees of the bottom color (shade).

Next, the reflection factor of the angle at which a color closest to the representative color would be obtained was determined by using the aforementioned equation, stated in the specification of Japanese Laid-open [KOKAI] Patent Publication No. 10045/98, for predicting the spectral reflectance of any angle.

Then, multiple regression analysis was performed to apply this angle to any metallic paint color, and Equation (3) was obtained from the function type of Equation (1).

$$D = 01.0612 * V1 + 0.253 * V2 + 15.11 \qquad \text{Equation (3)}$$

The multiple correlation coefficient of this multiple regression formula proved as high as 0.8, and it was confirmed that the angle giving the representative color of a metallic paint can be estimated with high precision. With the measured values at 25 and 45 degrees used here for the definitions V1 and V2, the lightness L* and the saturation c* were calculated by using JIS Z 8729.

Next, a random metallic color A1 was measured with the spectrophotometer shown in FIG. 2, and the definitions V25 and V45 were calculated from the measured values at 25 and 45 degrees by using Equation (2). Next, by using Equation (1), the representative angle which would give the representative color of this metallic paint was calculated.

Then, the reflection factor was calculated by using the aforementioned equation, stated in the specification of Japanese Laid-open [KOKAI] Patent Publication No. 10045/98, for predicting the spectral reflectance of any angle, and the Lab* value was obtained by using JIS Z 8729.

In this manner, the Lab* of the representative color A2 of the random metallic color A1 was determined.

Determination of the Hue-Tone Value:

The Lab* values of 1,098 color chips of M*MC measured in advance with a 45/0-degree spectrophotometer X968, a product of X-Rite of the United States are stored into a storage unit of the computer as the database.

Next, the color difference between the pertinent Lab* value in the M*MC in the database and the Lab* value of the representative color A2 determined as stated above was calculated by the method of JIS Z 8730, and the hue-tone value of the M*MC color chip giving the smallest color difference was supposed to be the hue-tone value A3 of the representative color A2.

The representative colors of four metallic paint colors according to eye observation and those based on the results of calculation are listed in Table 1.

Preparation of the Coating Color Map:

On a hue-tone chart 5 prepared on the monitor screen of a computer system, as shown in FIG. 3, the hue-tone value A3 of the representative color A2 of the aforementioned random metallic paint color A1, obtained as described above, was plotted, and the coating color computer graphics generated as described above was superposed over it.

TABLE 1

| 45/0-degree measured color | | | | Embodiment | | | Example for comparison | | |
|---|---|---|---|---|---|---|---|---|---|
| | values | | Eye-observed | Answer of | | | Calculated with | | |
| no | L* | a* | b* | color | Equation (1) | dM | Judgment | 45/0-degree L* | dM | Judgment |
| no. 1 | 17.2 | 11.7 | −32.3 | 7.5PB/DP2 | 7.5PB/Dp2 | 0.0 | ⊚ | 7.5PB/Dk2 | 2.0 | ○- |
| no. 2 | 61.3 | −10.6 | −4.3 | 7.5BG/LGR1 | 10BG/Lgr1 | 1.0 | ○ | 7.5BG/Gr1 | 6.0 | X |
| no. 3 | 55.3 | 3.1 | 11.4 | 5YR/LGR1 | 7.5YR/Lgr2 | 1.4 | ○ | 7.5YR/Gr1 | 6.1 | X |
| no. 4 | 46.8 | −7.5 | 7.3 | 5G/LGR2 | 2.5G/Lgr2 | 1.0 | ○ | 10GY/Gr2 | 6.3 | X |

In Table 1, from left to right, 1) no: the sample number; 2) 45/0-degree measured color L*a*b*: the L*a*b* value of measured color at 45-degree incidence and 0-degree light reception; 3) eye-observed color: the representative color of the metallic paint, determined by an experiment of eye observation by six subjects, this being the right answer, so to speak; 4) answer to Equation (1); 5) dM: the distance between the eye-observed color (right answer) on the hue-tone chart and the calculated color—the smaller this value, the better, i.e. if it is 0, the hue-tone values of the eye-observed color and of the calculated color will be identical; 6) judgment: ⊚ denotes exact identity, ○, identity within the tolerance for eye observation, and X, a large error; 7) example for comparison: the value calculated by using the measured color of Lab* under the 45/0-degree condition, which is the colorimetric standard for solids (the hue-tone value giving the smallest color difference)—especially, light gray nos. 2 to 4 give dark values, regarding which the judgment is X. In other words, if a 45/0-degree colorimetric value is used as it is, the result will be a considerably dark value because 45/0 degrees are close to the shaded side. On the other hand, eye observation gave a result somewhat toward the highlighted side. As a consequence, the judgment was X as stated above.

As is evident from this Table 1, a fairly high level of satisfaction was achieved.

Generation of the Coating Color Computer Graphics:

Coating color computer graphics was generated from spectral reflectances obtained by measuring the aforementioned random metallic paint color with a gonio-spectrophotometer, for instance, from 10 to 110 degrees in one-degree graduations. This metallic paint color computer graphics can as well be generated by determining the spectral reflectance of the metallic paint color at a desired angle from spectral reflectances measured under the above-mentioned five-angle condition for the metallic paint color in accordance with what is indicated in the specification of Japanese Laid-open [KOKAI] Patent Publication No. 10045/98 and a regression formula and regression coefficient calculated from the spectral reflectances measured under the aforementioned five-angle condition.

In the same procedure as described above, the hue-tone value of the representative color of other metallic paint colors were plotted, and the coating color computer graphics for those metallic paints were superposed over them.

In this way, by arranging computer graphics for a plurality of metallic paint colors, the coating color map of metallic paint colors shown in FIG. 3 was prepared.

What is claimed is:

1. A method for classifying and arranging metallic paint colors, comprising:
   determination of the representative one of the colors of each metallic paint color;
   calculation of the hue-tone value of said representative color;
   generation of coating color computer graphics representing the optical properties of said metallic paint color in a prescribed range of angles of observation; and
   preparation of a coating color map by arranging said coating color computer graphics over the hue-tone value of said representative color in a hue-tone chart on the monitor screen of a computer system.

2. A method, as claimed in claim 1, for determining the representative color of any metallic paint color by a multiple regression formula of the lightness and saturation of the metallic paint color at not fewer than two angles of observation.

3. A method, as claimed in claim 1, for calculating the hue-tone value of the representative color of any metallic paint color from spectral reflectances under a condition of at least two angles measured with a spectrophotometer.

4. A computer graphic apparatus comprising:
   a means to determine representative color of any metallic paint color out of colorimetric values of said metallic paint color at a plurality of angles of observation;
   a means to convert said representative color into a hue-tone value;
   a means to generate coating color computer graphics of said metallic paint color from the colorimetric values of said metallic paint color at a plurality of angles of observation; and
   a means to arrange and display said coating color computer graphics over the hue-tone value in a hue-tone chart generated on a display unit.

* * * * *